(12) United States Patent
Baldwin et al.

(10) Patent No.: US 7,598,454 B1
(45) Date of Patent: Oct. 6, 2009

(54) WHILE IN-USE ELECTRICAL DEVICE COVER

(75) Inventors: Jeffrey P. Baldwin, Phoenix, AZ (US);
Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 12/202,534

(22) Filed: Sep. 2, 2008

Related U.S. Application Data

(63) Continuation-in-part of application No. 11/780,839, filed on Jul. 20, 2007, which is a continuation-in-part of application No. 11/557,580, filed on Nov. 8, 2006, now Pat. No. 7,381,894, and a continuation-in-part of application No. 11/442,583, filed on May 26, 2006.

(60) Provisional application No. 60/971,388, filed on Sep. 11, 2007.

(51) Int. Cl.
*H02G 3/14* (2006.01)

(52) U.S. Cl. .................... 174/66; 174/67; 439/536; 220/241

(58) Field of Classification Search .................... 174/66, 174/67; 220/241, 242; 439/536; 248/906
See application file for complete search history.

(56) References Cited

U.S. PATENT DOCUMENTS

| 4,070,078 A | * | 1/1978 | Chrones | 439/142 |
| 5,285,538 A | * | 2/1994 | Hodak | 4/507 |

* cited by examiner

*Primary Examiner*—Dhiru R Patel
(74) *Attorney, Agent, or Firm*—Booth Udall, PLC

(57) ABSTRACT

An electrical device cover assembly is described. A base includes a perimeter edge, a cord port, at least two substantially perpendicular base walls joined by an angled wall, and an electrical outlet opening. A lid is moveable between open and closed positions. The lid includes two substantially perpendicular base walls joined by an angled lid wall, and a cord port notch. The base includes a hinge member adjacent the angled base wall that extends from the base toward the lid. The lid includes a hinge member adjacent the angled lid wall that extends from the lid toward the base, and a hinge shield that extends over both the lid hinge member and the base hinge member. The lid has a flexible element coupled to a lid ring, and is expandable so that the flexible element extends beyond the lid ring to enclose an electrical connector coupled with the electrical outlet.

18 Claims, 7 Drawing Sheets

WHILE IN-USE ELECTRICAL DEVICE COVER

CROSS REFERENCE TO RELATED APPLICATIONS

This document claims the benefit of the filing date of U.S. Provisional Patent Application 60/971,388 to Baldwin, et al. entitled "While In-Use Electrical Device Cover," which was filed on Sep. 11, 2007, the disclosure of which is hereby incorporated herein by reference.

This application is also a continuation-in-part application of U.S. patent application Ser. No. 11/780,839 to Shotey et al. entitled "Electrical Device Cover" which was filed on Jul. 20, 2007; which application was a continuation-in-part application of the earlier U.S. Utility patent application to Shotey et al. entitled "Electrical Device Cover," application Ser. No. 11/557,580, filed Nov. 8, 2006, now issued as U.S. Pat. No. 7,381,894, and U.S. patent application to Matlby et al. entitled "Expandable In-Use Outlet U.S. Pat. No. 7,396,996 Cover," application Ser. No. 11/422,583, filed Jun. 6, 2006, now U.S. Pat. No. 7,396,996, the contents of all of which are hereby incorporated herein by reference.

BACKGROUND

1. Technical Field

Aspects of this document relate generally to covers for electrical outlets.

2. Background Art

Electrical outlets that are installed outdoors may be exposed to rain, snow, debris, and other contaminants. While many different cover designs, including a base coupled with a lid by a hinge, have sought to shield electrical outlets from weather-related contaminants when electrical connectors are coupled with the outlets, such covers may not shield the cover hinges themselves from the elements and may open only along parallel and/or perpendicular planes.

SUMMARY

Aspects of this document relate to electrical device covers.

In one aspect, an electrical device cover assembly configured for mounting over an electrical outlet comprises a base comprising a perimeter edge, a base cord port disposed along the perimeter edge of the base, at least two substantially perpendicular base walls joined together by an angled base wall, and an opening large enough to receive an electrical outlet. A lid is moveable between an open position and a closed position with respect to the base, and the lid comprises two substantially perpendicular base walls, a lid cord port notch disposed along a perimeter edge of the lid. The at least two substantially perpendicular sides are joined together by an angled lid wall. The base further comprises a base hinge member immediately adjacent the angled base wall that extends from the base toward the lid. The lid further comprises a lid hinge member immediately adjacent the angled lid wall that extends from the lid toward the base, and a hinge shield extending over both the lid hinge member and the base hinge member. A cord port is formed by the cooperation of the base cord port notch and the lid cord port notch when the lid is in the closed position with respect to the base.

Particular implementations may include one or more of the following. The lid may comprise a lid face and a lid ring. The lid face and the lid ring may be coupled together by a flexible element, and the flexible element may comprise an expanded position. A majority of the flexible element may be configured to extend beyond the lid ring and may accommodate an electrical connector coupled with the electrical device when the lid is closed on the base. The lid may be biased in the closed position with respect to the base. The lid may be secured in position with respect to the base via a latch. The lid hinge member may extend rearward from a front surface of the lid. The base hinge member may extend forward from the angled base wall. The base hinge member may extend forward from the base.

In another aspect, an electrical device cover assembly configured for mounting over an electrical outlet comprises a base comprising a perimeter edge, at least two substantially perpendicular base walls joined together by an angled base wall, and an opening large enough to receive an electrical outlet within the perimeter edge. A lid is moveable between an open position and a closed position with respect to the base. The lid comprises two substantially perpendicular base walls, and at least two substantially perpendicular sides joined together by an angled lid wall. The base further comprises a base hinge member immediately adjacent the angled base wall extending from the base toward the lid. The lid further comprises a lid hinge member immediately adjacent the angled lid wall extending from the lid toward the base, and a hinge shield extending over both the lid hinge member and the base hinge member.

Particular implementations may include one or more of the following. One of the base and the lid may comprise a cord port. Both the base and the lid may comprise a cord port. The lid may comprise a lid face and a lid ring, and the lid face and the lid ring may be coupled together by a flexible element. The flexible element may comprise an expanded position where a majority of the flexible element is configured to extend beyond the lid ring and accommodate an electrical connector coupled with the electrical device with the lid is closed on the base. The lid may be biased in the closed position with respect to the base by a hinge spring. The lid may be secured in position with respect to the base via a latch. The lid hinge member may extend rearward from the front surface of lid. The base hinge member may extends forward from the angled base wall. The base hinge member may extend forward from the base. The hinge may be located inside the lid.

In another aspect, an electrical device cover assembly configured for mounting over an electrical device comprises a lid having a flexible element coupled along a majority of a perimeter of a lid ring. The lid ring is movably coupled by a hinge to a base, wherein the hinge pivots the lid with respect to the base along an axis parallel to an angled wall on a perimeter of the base. A cord port is located in an edge of a surface of the cover and the flexible element comprises an expanded position where a majority of the flexible element is configured to extend beyond the lid ring to continuously enclose an electrical connector coupled with the electrical device.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A collapsible in-use cover will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with implementations of electrical device covers from this disclosure. Accordingly, for example, although particular electrical device cover assemblies, bases, perimeter edges, base cord ports, base walls, angled base walls, openings, lids, lid cord port notches, angled lid walls, base hinge members, lid hinge members, hinge shields, cord ports, lid faces, lid rings, flexible elements, bias mechanisms and latches are disclosed, such electrical device cover assemblies, bases, lids, and implementing components may comprise any shape, size, style, type, model, version, measurement, concentration, material, quantity, and/or the like as is known in the art for such electrical device cover assemblies, electrical outlet mounting boxes, lids and implementing components, consistent with the intended operation of an electrical outlet cover.

Figure 1:
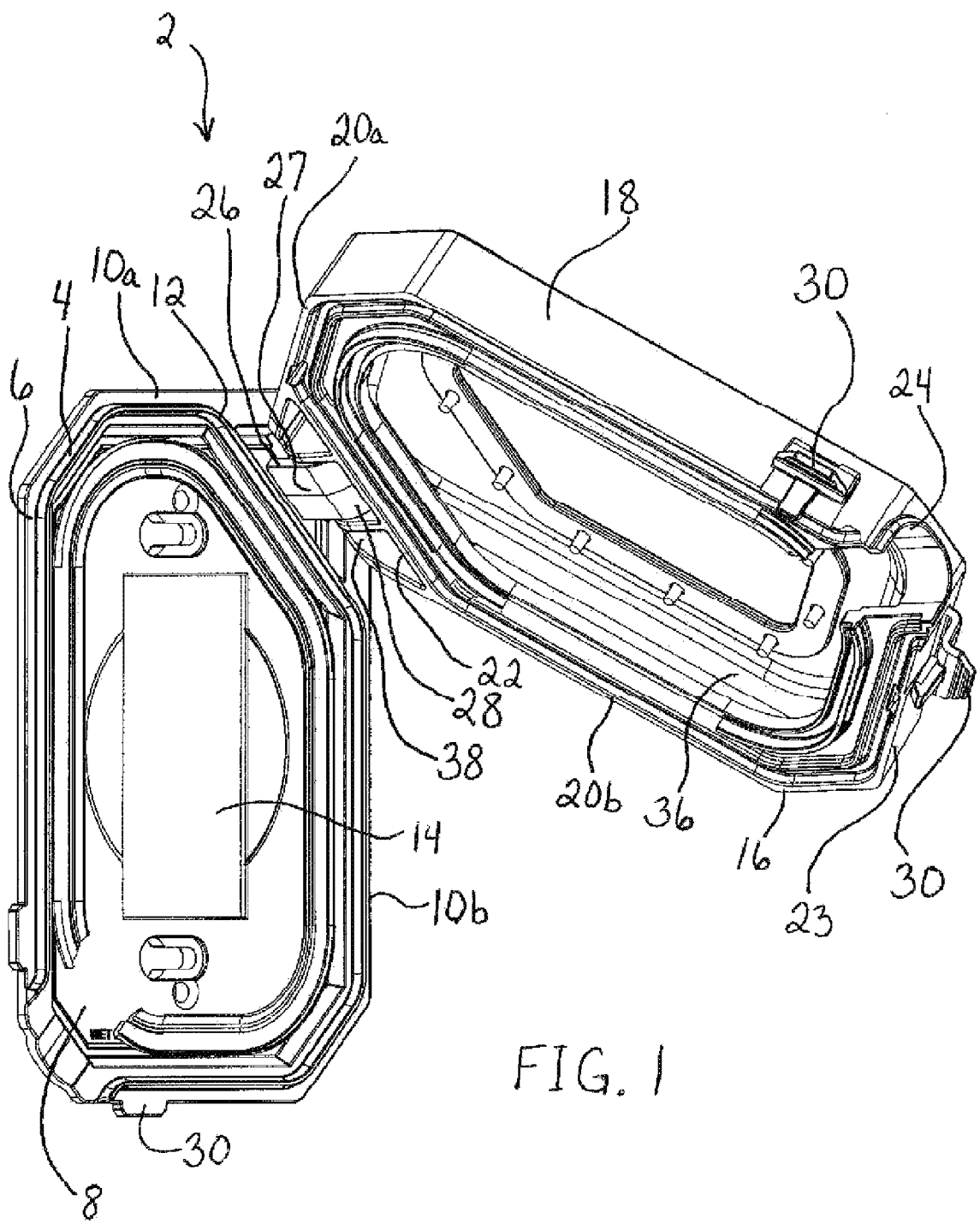
FIG. 1 is a front perspective view of a first implementation of an electrical outlet cover assembly.
Figure 2:
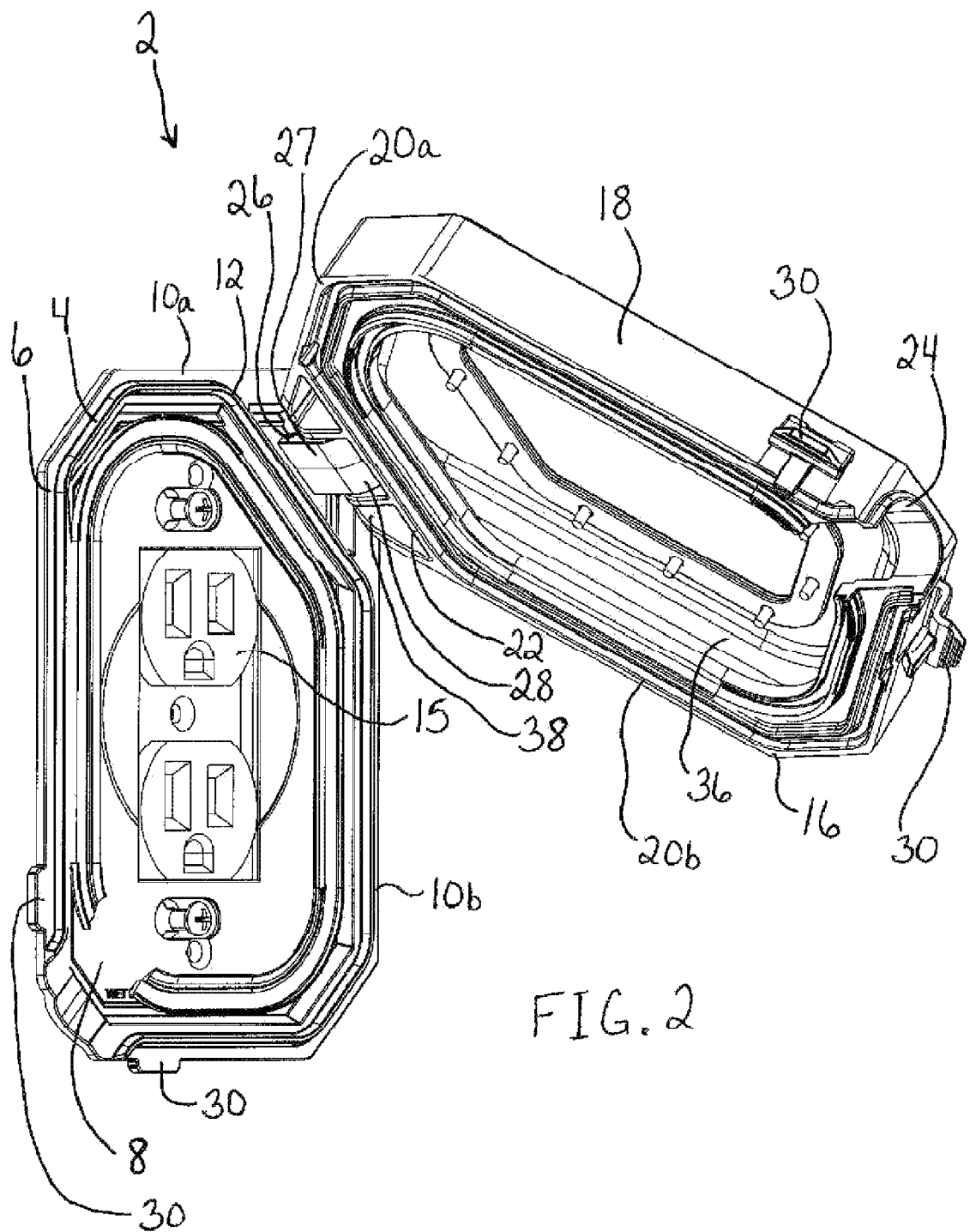
FIG. 2 is a front perspective view of the first implementation illustrated in FIG. 1 with an electrical outlet installed.

There are a variety of electrical outlet cover assembly implementations possible from the present disclosure. FIGS. 1-6 illustrate a first particular implementation of an electrical outlet cover assembly 2. The electrical outlet cover assembly 2 comprises base 4 and lid 16, which are coupled together via hinge 27 (which is formed by the mechanical cooperation of base hinge member 26 and lid hinge member 28, discussed further below). Base 4 comprises perimeter edge 6 and cord port notch 8, which is disposed along perimeter edge 6. Base 4 further comprises at least two substantially perpendicular base walls 10a and 10b, which are joined together by angled base wall 12. In addition, base 4 comprises an opening large enough to receive an electrical outlet 15 (FIG. 2).

Figure 3:
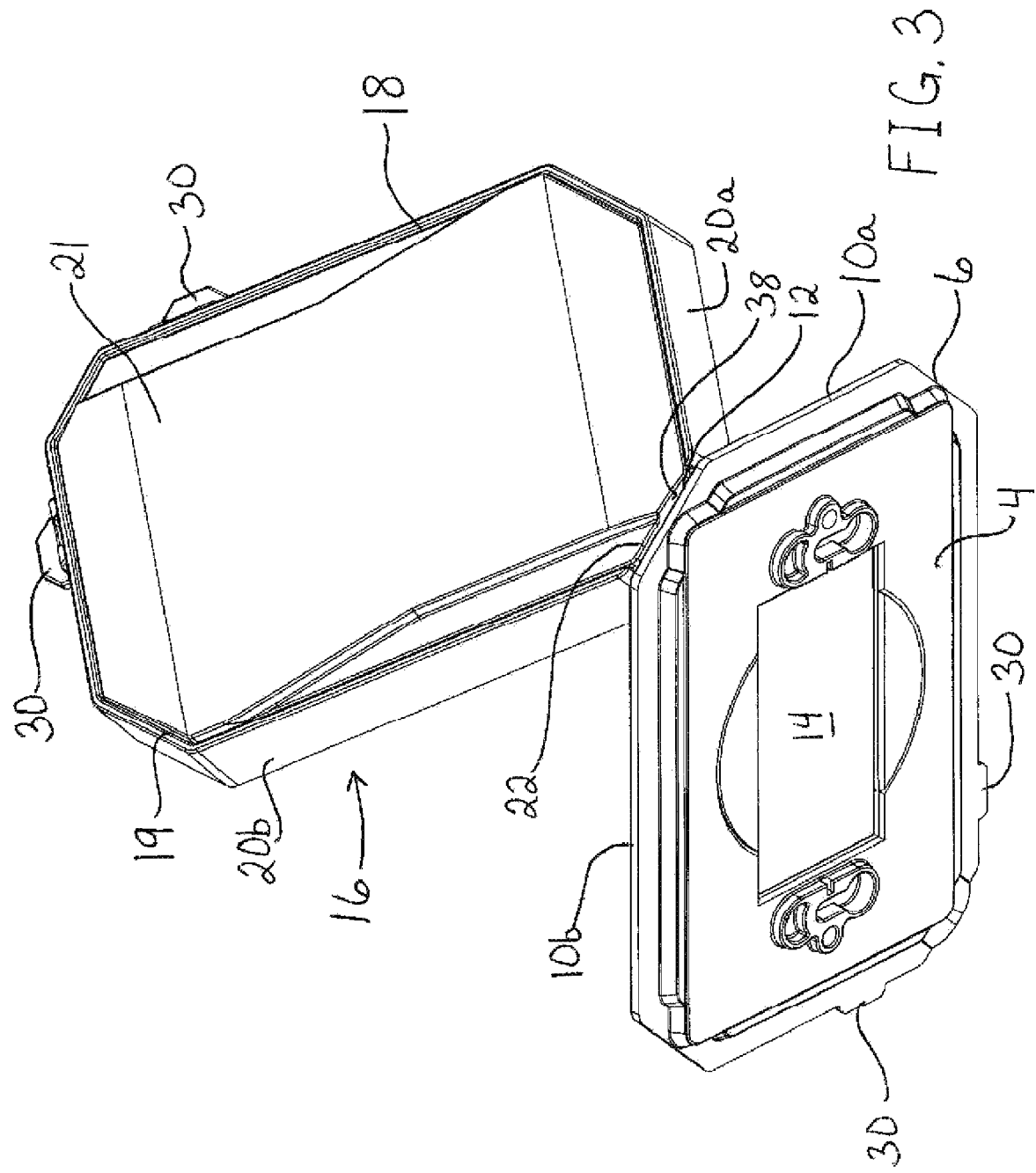
FIG. 3 is a rear perspective view of the first implementation of an electrical outlet cover assembly.
Figure 4:
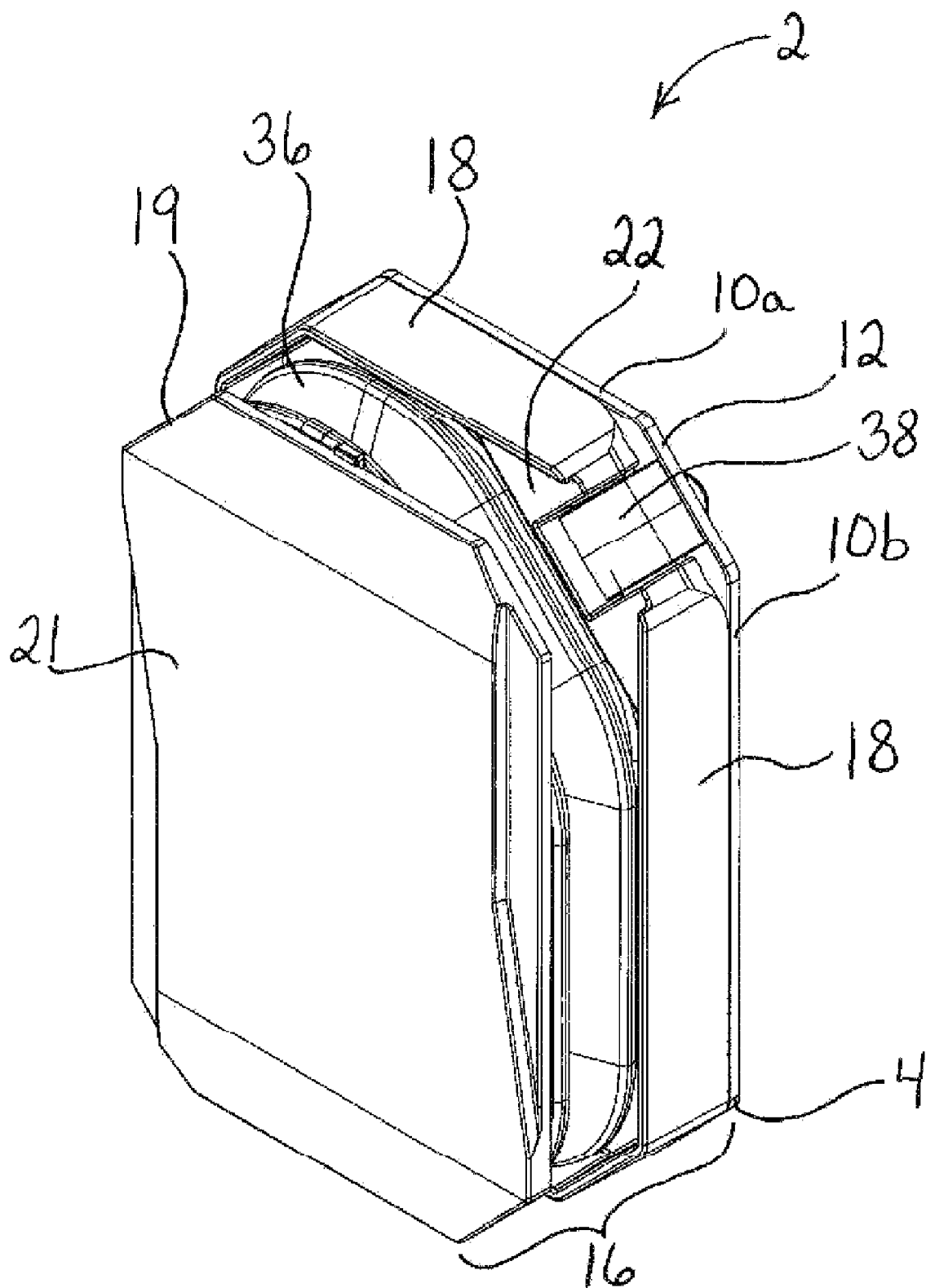
FIG. 4 is a front perspective view of the first implementation of an electrical outlet cover assembly with the lid in an expanded position.
Figure 5:
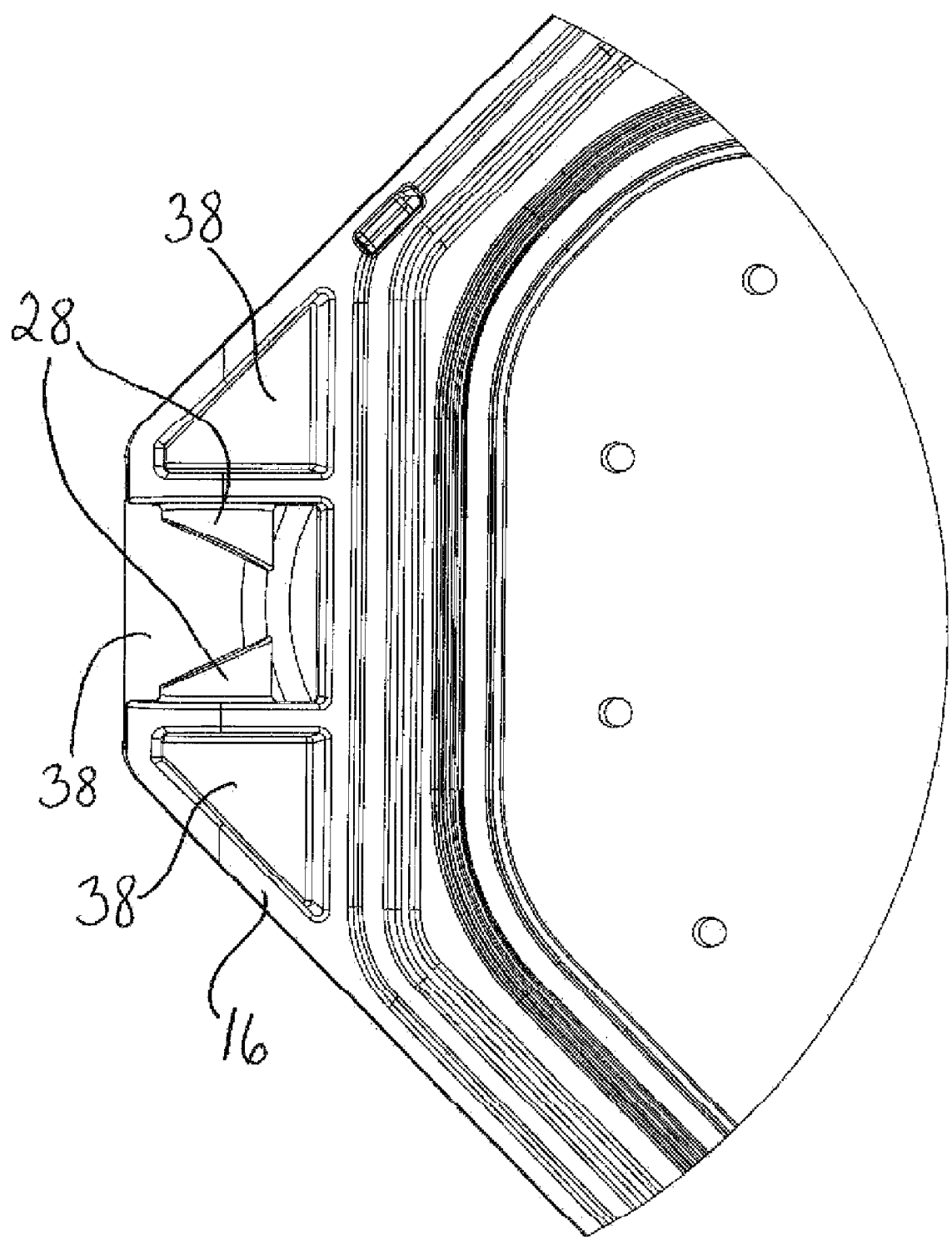
FIG. 5 is a close-up rear view of a of a particular portion of a lid hinge element and hinge shield of the first implementation.
Figure 6:
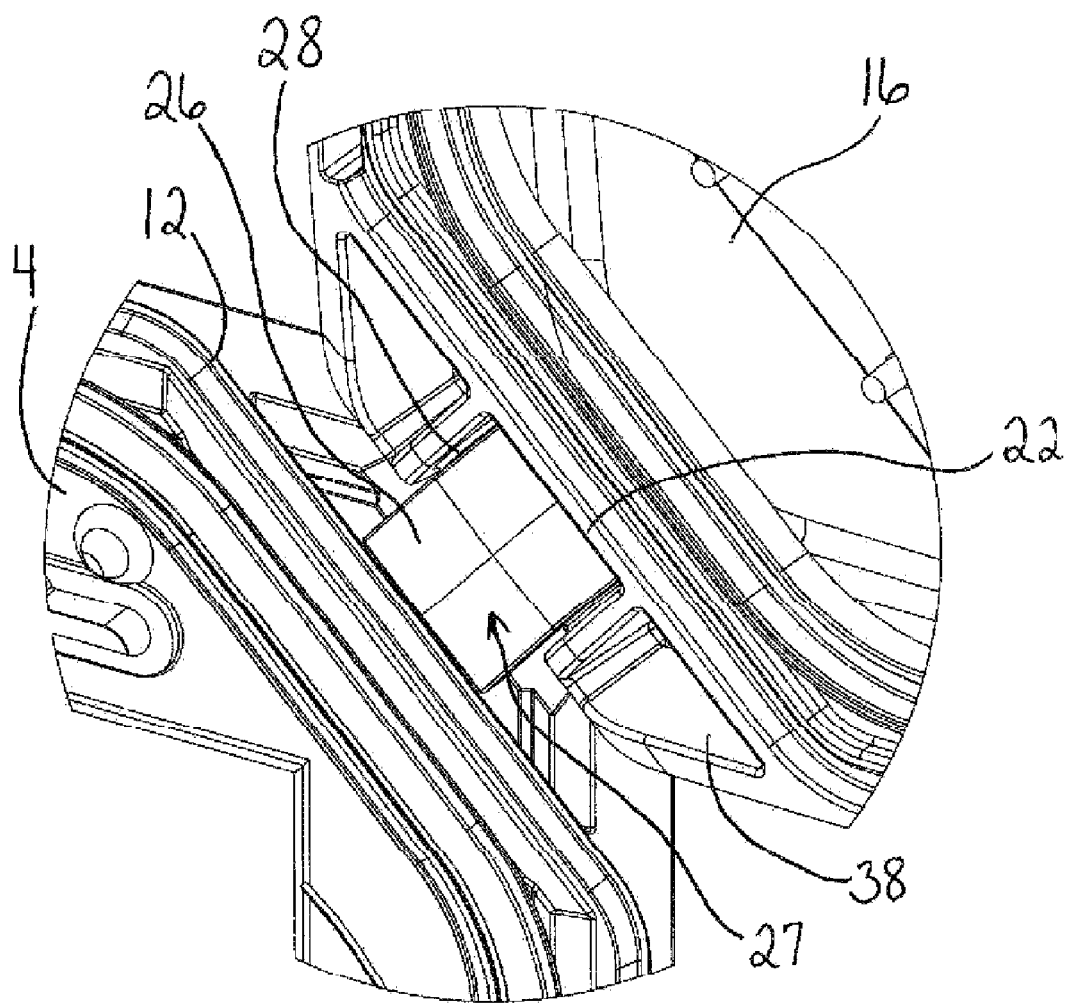
FIG. 6 is a close-up view of a particular portion of the assembly of the first implementation showing the lid coupled with a base according to the first implementation.

Lid 16 comprises a lid face 19 which comprises a front surface 21 (FIGS. 3 and 4). Lid face 19 is coupled with lid ring 18 via expansion section 36. In this particular implementation, lid ring 18 may comprise perimeter edge 23 one or more cord port notches 24, which are disposed along perimeter edge 23. In particular implementations, the one or more cord ports (and/or cord port notches) may be located in lid 16, such as along the bottom edge of the lid, or in both the lid and the base 4. It will be understood that the cord ports and cord port notches disclosed herein relate to a groove, a notch, or other cutout portion to allow an electrical device cord to pass therethrough when the electrical outlet 15 is in use and the lid 16 is closed (or partially closed) with respect to base 4. Inclusion of the cord port in the bottom edge of the lid may also assist by providing a finger pull through which to open the lid.

Still referring to FIGS. 1-6, expansion section 36 is expandable between a collapsed position (as shown in FIG. 3, where lid 16 is open with respect to base 4), and various expanded positions. One non-limiting example of an expanded position is shown in FIG. 4, where expansion section 36 is in an expanded position and lid 16 is closed with respect to base 4. For locations where the electrical outlet can be exposed to weather conditions or water or other contaminants, it is often desirable to be able to protect the electrical outlet by closing the lid of the cover while a plug is plugged into the outlet. Such outlet covers are called while-in-use covers. Though it is not required in every implementation, the lid face 19 of the lid 16 of the present implementation is coupled to the remainder of the lid by expandable section 36 to allow the plug to be plugged into the outlet when the lid 16 is closed on the base 4. U.S. Pat. No. 7,381,894, the disclosure of which is incorporated herein by reference, explains a variety of ways the expandable section may be coupled and may operate and reliance is made on that disclosure for a full explanation of the expandable section.

Lid ring 18 further comprises two substantially perpendicular walls 20a and 20b which are joined together by angled lid wall 22. Lid hinge member 28 is located immediately adjacent to the angled lid wall 22 and extends from the lid towards base 4, where it is coupled in mechanical cooperation with base hinge element 26, thus forming hinge 27 (which allows lid 16 to be moveable between an open position and a closed position). In some particular implementations, lid hinge member 28 may be integral with, attached to or otherwise coupled to angled lid wall 22. In other particular implementations, lid hinge member 28 may extend rearward from front surface 21 of lid 16. As disclosed above, hinge 27 is comprised by the mechanical cooperation of lid hinge element 28 and base hinge element 26. In the particular implementation shown in FIGS. 1-6, base hinge member 26 is located immediately adjacent to the angled base wall 12 and extending from base 4 towards lid 16. In some particular implementations, however, base hinge member 26 may be integral with, attached or otherwise coupled to angled base wall 12. In other particular implementations, base hinge member 26 may extend forward from angled base wall 12. Alternatively, base hinge member 26 may extend forward from the base In any event, base hinge member 26 extends from base 4 towards lid 16.

In some particular implementations, hinge 27 may comprise a spring or other biasing mechanism to bias the lid to its closed position with respect to the base, such as with a coil spring or leaf spring. It is expected that other hinge configurations and many biased hinge configurations are possible and may be substituted from the art into the particular implementation shown in the Figures without undue experimentation. An example of a biased hinge is disclosed in U.S. Pat. No. 6,476,321 to Shotey, et. al., the disclosure of which is incorporated by reference herein.

Still referring to FIGS. 1-6, when lid 16 is coupled with base 4 via hinge 27, the lid 16 is moveable between an open position and a closed position with respect to the base 4. In the particular implementation shown in FIGS. 1-6, the lid 16 is movable on an axis that is diagonal with respect to the fixed plane of base 4. By diagonal, it is meant that the lid 16 is moveable along an axis that is neither parallel with, nor perpendicular to the first and second base walls 10a and 10b when base 4 is installed. Base 4 and lid 16 each comprise latch components 30 which, when the lid 16 is in a closed position with respect to base 4, may reversibly secure lid 16 with respect to base 4. In particular implementations, latch component(s) 30 may be located on the lid 16, such as along the bottom edge of lid 16, on the base 4, or on both lid 16 and base 4. Inclusion of the latch component(s) 30 on the bottom edge of the lid may also assist by providing a finger pull by which to open the lid. For locations where the electrical outlet can be exposed to weather conditions or water or other contaminants, it is often desired to be able to protect the electrical outlet by latching the lid of the cover while a plug is plugged into the electrical outlet 15.

FIGS. 1-5 and 6 further illustrate a first particular implementation of an electrical outlet cover assembly, particularly the relationship between hinge 27 and hinge shield 38. In particular, when lid 16 is coupled with base 4 (via hinge 27), at least a portion of hinge 27 is located beneath hinge shield 38 (FIG. 4). As can be seen from a comparison of FIG. 3 (lid in open position) to FIG. 4 (lid in closed position), whether lid 16 is open or closed with respect to base 4, hinge shield 38 extends over at least a portion of hinge 27, thus resisting the entry of weather-elements and/or debris. The respective configurations of angled lid wall 22 and hinge shield 38 do not impede the diagonal axial movement of lid 16 with respect to base 4. The configuration of angled lid wall 22 and hinge shield 38 further do not interfere with the movement of lid 16 throughout its movement until lid 16 is opened to a position where the plane of lid 16 is substantially perpendicular to the plane of base 4. Other configurations may allow lid 16 to open beyond the plane of the lid 16 being substantially perpendicular to the plane of the base 4.

Figure 7:
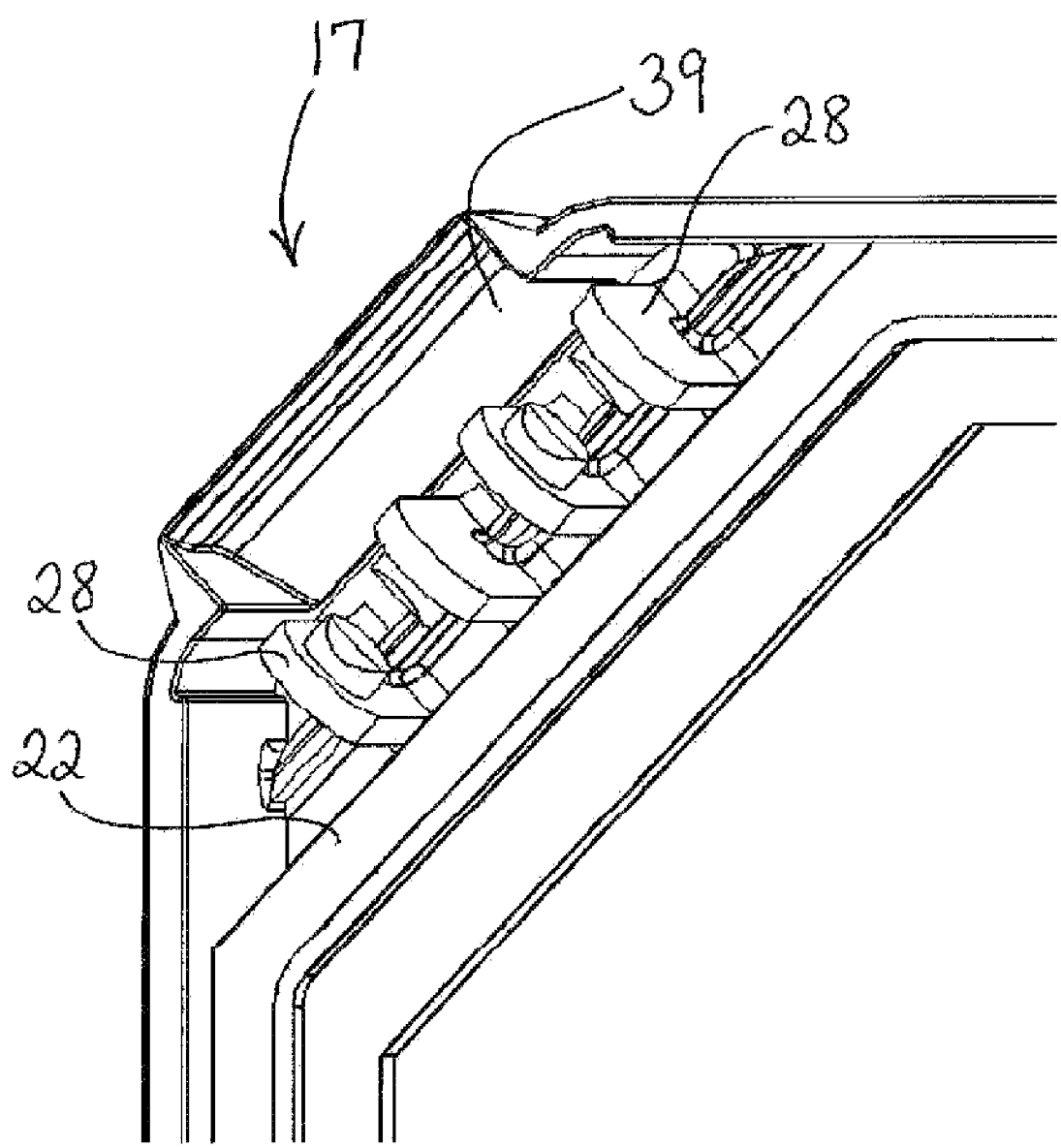
FIG. 7 is a close-up rear perspective view of a particular portion of a lid hinge element and hinge shield of a second implementation.

FIG. 7 illustrates a second particular implementation of an electrical outlet cover assembly 3. The implementation illustrated in FIG. 7 may comprise any or all of the features of the first implementation disclosed herein (which are designated by like reference numerals), along with additional features relating to the configuration and operation of hinge shield. In particular, lid 17 comprises hinge shield 39 which extends from angled side wall 12 of the base 4, such that when lid 17 is lifted to an open position with respect to base 4, the hinge shield 39 extends under (or behind when the base is installed on a wall) one or more base hinge elements 26, thus resisting the entry of weather-elements and/or debris. The hinge shield 39 of this particular implementation further acts as a stop underneath (or behind) the one or more base hinge elements 26, such that an outside surface of hinge shield 39 contacts at least a portion of base 4 (or a portion of a base wall, in other particular implementations). While features relating to expandability/collapsibility, latching, cord ports, and other features of the first particular implementation disclosed herein (FIGS. 1-6), are not shown in FIG. 7, it is specifically contemplated that these features can be included in the second implementation shown and described with respect to FIG. 7.

The concepts of using bases and lids to cover an electrical outlet, as disclosed herein, is not limited to outdoor covers or to the specific implementations shown herein. For example, it is specifically contemplated that the components included in a particular implementation of an electrical device cover may be formed of any of many different types of materials or combinations that can readily be formed into shaped objects and that are consistent with the intended operation of an electrical outlet cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical device cover assemblies, bases, perimeter edges, base cord ports, base walls, angled base walls, openings, lids, lid cord port notches, angled lid walls, base hinge members, lid hinge members, hinge shields, cord ports, lid faces, lid rings, flexible elements, bias mechanisms and latches, and any other components forming a particular implementation of an electrical outlet cover assembly may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for an electrical outlet cover assembly may be utilized. Accordingly, for example, although bases, hinges, and lids may be disclosed, such components may comprise any shape, size, style, type, model, version, class, grade, measurement, concentration, material, weight, quantity, and/or the like consistent with the intended operation of a method and/or system implementation for an electrical outlet cover assembly may be used.

In places where the description above refers to particular implementations of an electrical outlet cover assembly, it should be readily apparent that a number of modifications may be made without departing from the spirit thereof and that these implementations may be applied to other electrical outlet covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover assembly configured for mounting over an electrical outlet comprising:
   a base comprising a perimeter edge, at least two substantially perpendicular base walls joined together by an angled base wall, and an opening large enough to receive an electrical outlet within the perimeter edge; and
   a lid moveable between an open position and a closed position with respect to the base, the lid comprising two substantially perpendicular base walls, and at least two substantially perpendicular sides joined together by an angled lid wall;
   wherein the base further comprises a base hinge member immediately adjacent the angled base wall extending from the base toward the lid, and the lid further comprises a lid hinge member immediately adjacent the angled lid wall extending from the lid toward the base, and a hinge shield extending over both the lid hinge member and the base hinge member.

2. The electrical device cover assembly of claim 1, wherein: the base further comprises a base cord port disposed along the perimeter edge of the base; the lid further comprises a lid cord port notch disposed along a perimeter edge of the lid; and the electrical device cover assembly further comprises a cord port formed by the cooperation of the base cord port notch and the lid cord port notch when the lid is in the closed position with respect to the base.

3. The electrical device cover assembly of claim 1, wherein the lid comprises a lid face and a lid ring, the lid face and the lid ring coupled together by a flexible element, wherein the flexible element comprises an expanded position where a majority of the flexible element is configured to extend beyond the lid ring and accommodate an electrical connector coupled with the electrical device when the lid is closed on the base.

4. The electrical device cover assembly of claim 1, wherein the lid is biased in the closed position with respect to the base.

5. The electrical device cover assembly of claim 1, wherein the lid is secured in position with respect to the base via a latch.

6. The electrical device cover assembly of claim 1, wherein the lid hinge member extends rearward from a front surface of the lid.

7. The electrical device cover assembly of claim 1, wherein the base hinge member extends forward from the angled base wall.

8. The electrical device cover assembly of claim 1, wherein the base hinge member extends forward from the base.

9. The electrical device cover assembly of claim 1, wherein one of the base and the lid comprise a cord port.

10. The electrical device cover assembly of claim 1, wherein both the base and the lid comprise a cord port.

11. The electrical device cover of claim 1, wherein the lid comprises a lid face and a lid ring, the lid face and the lid ring coupled together by a flexible element, wherein the flexible element comprises an expanded position where a majority of the flexible element is configured to extend beyond the lid ring and accommodate an electrical connector coupled with the electrical device with the lid is closed on the base.

12. The electrical device cover assembly of claim 1, wherein the lid is biased in the closed position with respect to the base by a hinge spring.

13. The electrical device cover assembly of claim 1, wherein the lid is secured in position with respect to the base via a latch.

14. The electrical device cover assembly of claim 1, wherein the lid hinge member extends rearward from the front surface of lid.

15. The electrical device cover assembly of claim 1, wherein the base hinge member extends forward from the angled base wall.

16. The electrical device cover assembly of claim 1, wherein the base hinge member extends forward from the base.

17. The electrical device cover assembly of claim 1, wherein the hinge is located inside the lid.

18. An electrical device cover assembly configured for mounting over an electrical device, the electrical device cover comprising:
   a lid comprising a flexible element coupled along a majority of a perimeter of a lid ring, the lid ring movably coupled by a hinge to a base, wherein the hinge pivots the lid with respect to the base along an axis parallel to an angled wall on a perimeter of the base; and
   a cord port in an edge of a surface of the lid ring;
   wherein the flexible element comprises an expanded position where a majority of the flexible element is configured to extend beyond the lid ring to continuously enclose an electrical connector coupled with the electrical outlet.

* * * * *